April 4, 1967 J. HENRY-BAUDOT 3,312,846
ELECTRIC ROTATING MACHINES
Filed Aug. 6, 1963 2 Sheets-Sheet 1

Inventor
Jacques Henry-Baudot
By Kenyon, Palmer, Stewart & Estabrook
attorneys

United States Patent Office 3,312,846
Patented Apr. 4, 1967

3,312,846
ELECTRIC ROTATING MACHINES
Jacques Henry-Baudot, Antony, France, assignor to
Printed Motors, Inc., New York, N.Y.
Filed Aug. 6, 1963, Ser. No. 300,288
Claims priority, application France, Sept. 11, 1962,
909,193, Patent 1,341,582
3 Claims. (Cl. 310—266)

The present invention concerns improvements in or relating to electric rotating machines of the type which includes an armature or field winding made of flat and thin conductors bonded to the faces of a thin insulating carrier and formed for instance by printed-circuit techniques enabling the repetitive production of a pattern of conductors on an insulating surface.

In this kind of machine, the printed conductors are placed within the magnetic airgap and it is highly desirable consequently that the windings be thin. On the other hand, such thin members may prove of insufficient mechanical strength for avoiding undue deformations, hence deteriotations, during the useful life of the machines. From another point of view, it is most often highly desirable to have a rotatable part of low inertia so that such thin conductor members cannot be applied on rotatable magnetic parts of high mechanical strength. It is the object of the invention to so design these machines as to simultaneously avoid the above recited drawbacks.

In cylindrical machines, the rotatable part may consist of either a printed-circuit winding (D.C. machines mainly) or a copper cylinder (induction machines with stationary field printed-circuit winding surrounding said rotatable copper cylinder). Usually such rotatable member was mounted supported by one end only, hence the possibilities of deformations, when not applied to a rotating magnetic cylinder increasing the inertia of said rotatable part. In disc-type machines, having a flat annular airgap, the rotatable part may consist also of either a printed-circuit winding or a copper disc, according to whether the machine is a D.C. or an A.C. one. The same dangers of deterioration exist though the mechanical mounting is simpler than in cylindrical machines.

According to the invention, the rotatable part of a machine comprising at least one printed-circuit thin winding member is made as a hollow and substantially closed cylinder secured by its end faces to the shaft of the machine. Part at least of said cylinder constitutes the conductive armature in the machine and, within said hollow cylinder is mounted a magnetic cylindrical piece freely rotatable on said shaft. The armature part is the peripheral face of the cylinder in a cylindrical machine, it is the radial faces in a flat annular airgap machine. With this structure the rotatable part only may comprise a thin member rigidified by the very shape given to it, i.e. a cylinder with lateral wall and end walls constituting a mechanically resistant member even with very thin walls for the armature part therein.

Reference is made to the accompanying drawings, wherein.

Figure 1:
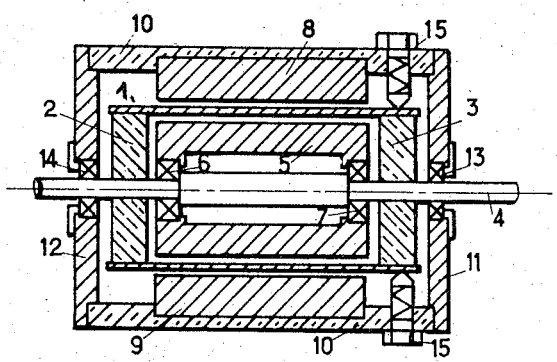
FIG. 1 shows a cross-section of one embodiment of the invention in a cylindrical machine, FIG. 2 showing in false perspective the rotor winding of said machine.
Figure 2:
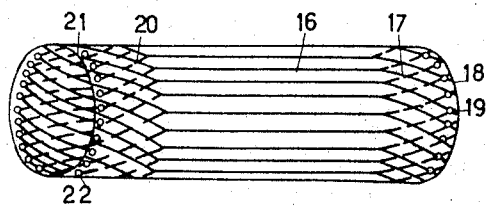

Referring to FIGS. 1 and 2, the rotor is made of a cylindrical winding printed on the two faces of a cylindrical carrier, said cylindrical winding 1 being affixed, with a longitudinal substantially uniform stretch between end annular supports 2 and 3 secured to the shaft 4. This rotor constitutes a substantially closed cylinder having a very thin lateral wall made of the printed-circuit winding of FIG. 2. This winding would distort if not supported by its ends. The example of printed-circuit winding of FIG. 2 relates to a series-wave pattern, but it may be of the lap-wound pattern as well. Each half-turn conductor comprises a mid-portion 16 along a generant of the cylinder, extending on either side as evolvent parts 17 and 20 ending in terminals 18 and 21 respectively. Both faces of the thin insulating cylinder are coated with such conductors, the directions of evolvents are reversed from one face to the other one. The end terminals of the conductors are connected from face to face, for instance by means of metallized holes 19 and 22 making through-connections therefor. Such face-to-face connections could also be made by brazing or soldering ends protruding with respect to the insulator.

Prior to assembling the rotor, a magnetic cylinder 5 is mounted on bearings 6 and 7 on the shaft 4 of the machine. Said cylinder may freely rotate around the shaft if magnetically driven, though most of the time it will be still during the use of the machine. This magnetic cylinder will serve as a yoke for closing the magnetic flux lines passing through the armature. The field assembly comprised magnets such as 8 and 9 distributed around a cylinder and supported by struts such as 10, for instance, supported by casing plates 11 and 12 supporting the bearings 13 and 14 for the shaft 4. Brushes such as 15 are carried by the stator assembly for translating current to and from the winding. The magnet ring closely surrounds the armature.

Figure 3:
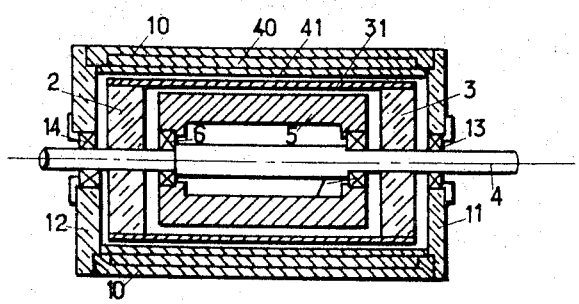
FIG. 3 shows a cross-section of a second example of embodiment of the invention in a cylindrical machine of the induction type, FIG. 4 showing in false perspective the rotor in said machine.
Figure 4:
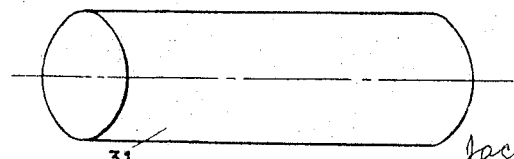

In the embodiment of FIGS. 3 and 4, the rotor is made of a thin copper cylinder 31 supported by two discs 2 and 3 secured to the shaft 4. Within the rotor cylinder is mounted a coaxial magnetic cylinder 5 on bearings 6 and 7 on the shaft 4. This magnetic member 5 is preferably made of stacked sheets along the axis of the machine. The field assembly comprises a cylindrical thin printed-circuit winding 40 which may be of the same kind as the one in FIG. 2 but provided with taps for the supply of the alternating current. This winding is mounted within a magnetic sleeve 41, preferably made of two half-sleeves for ease of assembly. The number of taps such as 39 depends on the number of electrical phases of the supply, said taps are spaced apart by one pole pitch of the winding. The remaining part of the machine is the same as in FIG. 1. The copper cylinder 31 may be very thin and does not need to be self-supporting, the mechanical strength being ensured by its fixation and stretching on the rigid end discs 2 and 3.

As a variation, the magnetic member 5 may comprise magnetic poles of permanent character, of identical number to the number of magnetic poles or the half-phases of the field winding, as the case may be. In the machine according to FIG. 3, the member 5 will then rotate synchronously though freely from the shaft 4.

The operation of such machines may be explained as follows: at rest, the cylinder 1 or 31 can occupy any angular position and so can the magnetic cylinder 5 unless the latter includes magnetic poles together with the field member in which case the cylinder 5 orientates itself corresponding to the greatest magnetic flux in the airgap. When a motive torque appears, only the rotor cylinder, 1 or 31, is driven and its sole and small inertia is to be taken into account. Note that the end supporting discs 2 and 3 may be relatively lightweight as they may be provided with slots so as to form a spider. The member 5 is only rotated by the friction torque at its bearings (when magnet poles are present in the member 5, the electromagnetic forces are added to the frictional forces of the bearing). In any case, the true inertia opposed to the motor torque is only that of the rotor parts secured to the shaft 4.

Such a machine may be made of reduced diameter for a given power since with such a construction, the length of the rotor may be increased at will without harmful effect. Finally then, the design enables the production of machines having a better efficiency for the concerned kind of machines.

The magnetic poles may be made either salient or smooth in such machines, i.e. made of separate magnets on a yoke or of a coercive material cylinder wherein said poles have been permanently impressed by local magnetization.

Figure 5:
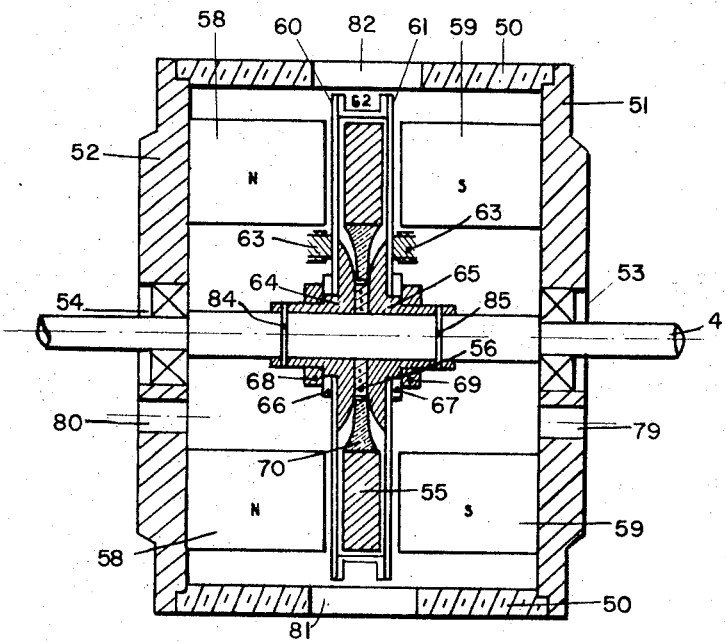
FIG. 5 shows a cross-section view of a flat annular airgap machine embodying another example of the invention, FIG. 6 showing an end view of the rotatable part in said machine.
Figure 6:
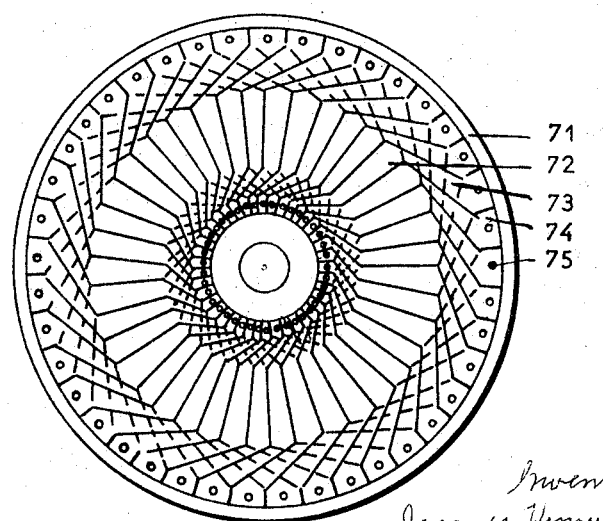

Referring now to FIGS. 5 and 6, there is shown a flat annular airgap machine according to the invention, where in the component members are of generally discoidal shapes. In this instance the machine comprises two printed-circuit windings which does not unduly increase the inertia of the rotor whereas the electromagnetic efficiency is substantially higher since the ratio of the torque to the inertia is not changed.

The shown embodiment relates to a D.C. machine, the transposition to an induction machine would thereafter be obvious with respect of what has been said and shown for a cylindrical machine (substitution of two copper discs for the winding discs and substitution of disc-formed field windings to the permanent magnet inductor rings).

In FIGS. 5 and 6, two printed-circuit windings 60 and 61 are shown as radial end faces of a cylinder completed by an annular ring 62 upon the end flanges of which the said windings are secured by any suitable means, gluing for instance. Each winding may have, illustratively though not limitatively, the pattern disclosed in FIG. 6. It is a two faced winding with two sets of half-turn conductors over an annulus of thin insulating material 71. Each half-turn conductor comprises a substantially radial mid-portion 72 extended at opposite ends with slanted or curved (if required) portions 73 and 76 ending in flat terminals 74 and 77 wherein face-to-face connections are made through metallized holes 75 and 78 for instance, between registering end of the conductors on the two faces. The orientations of the slanted parts are reversed from one face to the other one. The example of pattern shown in FIG. 6 is for a series-wave winding of forty-one turns in an eight pole machine. The two winding members 60 and 61 are united by the annular piece 62 (which may be replaced by a number of distributed streets therearound) so as to constitute a cylinder of relatively small axial extent within which is located a magnetic ring piece 55 mounted upon a support 70 carried by an annular bearing on the shaft 4. Sleeves 64 and 65 are mounted on the shaft and pinned thereto for instance by pins 84 and 85 and press against the inner edges of the winding discs through washers 66 and 67, fixation being ensured by means of nuts 68 and 69.

Two annular sets of magnets 58 and 59 are mounted on the sides of the rotor. For each north pole on one side there is a corresponding south pole on the other side and, of course, the north and south poles alternate in each set. Instead of permanent magnets, rings of coercive material such as ferrite can be used with the poles impressed thereon. The freely rotating annulus 55 may be of soft iron or of ferrite (with magnetic impressed poles).

The field members are mounted on annular plates 51 and 52 spaced apart and secured together by a sleeve 50, on two half-sleeves for instance for ease of assembly, and provided with ventilation openings such as 81 and 82. The plates 51 and 52 also support brushes 63 for the two armature windings and preferably these brushes bear against the windings at locations backed up by the flanges of the sleeves 64 and 65.

For avoiding any undue complication, the two windings are left separated in the machine and their electrical interconnection if any will be made through the brush circuits outside the machine proper.

When the machine starts, the freely rotating part 55 does not participate to the inertia of the rotor.

What is claimed is:
1. A rotary electric machine comprising in combination:
   (1) a pair of magnetic members each comprising an annularly-arranged series of alternate magnetic poles, said members being spaced axially from each other to define therebetween an annular axial air gap;
   (2) a hollow substantially disk-shaped armature positioned within said air gap and having windings comprising thin conductive members intimately bonded to its opposite radial faces within said air gap;
   (3) a magnetic annulus within and spaced from said armature for completing the flux path between said pair of magnetic members and through said armature,
   (4) and a shaft and means rigidly connecting said armature to said shaft, said annulus being mounted for free rotation with respect to said armature and said shaft.
2. A machine as defined by claim 1 and including at least two brush members contacting said conductive members on opposite faces respectively of said armature.
3. A machine as defined by claim 1 and further including means carried by said shaft and bearing against the inner radial faces of said armature along annular areas corresponding to the annular area of brush contact on the outer radial faces of said armature.

References Cited by the Examiner

UNITED STATES PATENTS

| | | | |
|---|---|---|---|
| 2,492,678 | 12/1949 | Amtsberg | 310—266 |
| 2,542,659 | 2/1951 | Gillett | 310—266 |
| 2,719,931 | 10/1955 | Kober | 310—268 X |
| 3,054,011 | 9/1962 | Silversholtz et al. | 310—268 |
| 3,084,420 | 4/1963 | Burr et al. | 310—268 X |
| 3,169,204 | 2/1965 | Moressee et al. | 310—268 |

FOREIGN PATENTS

| | | |
|---|---|---|
| 635,625 | 4/1950 | Great Britain. |
| 4,170 | 9/1891 | Switzerland. |

MILTON O. HIRSHFIELD, *Primary Examiner.*

J. J. SWARTZ, *Assistant Examiner.*